US012138749B2

(12) United States Patent
Salas

(10) Patent No.: US 12,138,749 B2
(45) Date of Patent: Nov. 12, 2024

(54) BASIN WRENCH ASSEMBLY

(71) Applicant: Francisco Salas, North Hills, CA (US)

(72) Inventor: Francisco Salas, North Hills, CA (US)

( * ) Notice: Subject to any disclaimer, the term of this patent is extended or adjusted under 35 U.S.C. 154(b) by 366 days.

(21) Appl. No.: 17/688,565

(22) Filed: Mar. 7, 2022

(65) Prior Publication Data

US 2023/0278174 A1 Sep. 7, 2023

(51) Int. Cl.

*B25B 13/48* (2006.01)
*B25G 1/00* (2006.01)
*B25G 1/04* (2006.01)

(52) U.S. Cl.

CPC ............ *B25B 13/481* (2013.01); *B25G 1/005* (2013.01); *B25G 1/043* (2013.01)

(58) Field of Classification Search

CPC .............. B25B 13/481; B25B 13/5016; B25B 13/5025; B25B 13/505; B25B 13/58; B25B 23/16; B25B 13/48; B25B 13/461; B25B 23/0007; B25B 23/0042; B25G 1/005; B25G 1/043; B25G 1/04

See application file for complete search history.

(56) References Cited

U.S. PATENT DOCUMENTS 1,456,290 A * 5/1923 Tell .......................... B25B 13/44 81/177.85
1,795,048 A 3/1931 Schuh
2,166,449 A * 7/1939 Sharpe ................ B25B 23/0035 81/98
2,438,633 A * 3/1948 Condor ............... B25B 23/0021 81/177.2
2,491,623 A 12/1949 Sesak
2,819,637 A 1/1958 Pierre
2,963,930 A * 12/1960 Clothier ................. B25G 1/043 81/177.2
3,972,252 A * 8/1976 Hunter .................. B25B 13/467 81/57.29
4,485,702 A * 12/1984 Swan .................... B25B 13/481 81/177.2
4,905,548 A * 3/1990 Colace ................ B25B 23/0021 81/177.2
5,927,161 A * 7/1999 Clifford .............. B25B 23/0021 81/177.85
6,135,607 A * 10/2000 Cook ........................ B25F 1/02 362/120
7,121,172 B1 10/2006 Daniels
7,188,553 B1 * 3/2007 Pryor .................. B25B 23/0021 81/439
9,381,628 B1 * 7/2016 Garza ................... B25B 13/505
9,616,555 B2 4/2017 Chartier (Continued)

FOREIGN PATENT DOCUMENTS

WO WO2014066732 5/2014

*Primary Examiner* — David B. Thomas

(57) ABSTRACT

A basin wrench assembly for manipulating a nut on a faucet water line includes a handle which comprises a first section that slidably engages a second section such that the handle has a telescopically adjustable length. A wrench is pivotally coupled to the handle such that the wrench is pivotable along an axis that is perpendicularly oriented with a longitudinal axis of the handle. In this way the wrench can be positioned to engage a nut on a water line attached to a faucet beneath a counter. The wrench comprises a pair of jaws that is pivotally coupled to each other thereby facilitating each of the jaws to engage the nut.

11 Claims, 7 Drawing Sheets

(56) References Cited

U.S. PATENT DOCUMENTS

| | | | | |
|---|---|---|---|---|
| 9,669,537 | B2 * | 6/2017 | Hartman | B25B 13/06 |
| 9,764,458 | B1 * | 9/2017 | Resh | B25G 1/04 |
| 9,969,062 | B2 * | 5/2018 | Huang | B25B 13/28 |
| 10,155,307 | B2 * | 12/2018 | Tian | B25G 1/043 |
| 10,315,304 | B1 * | 6/2019 | Cowan | B25G 1/04 |
| 10,611,013 | B2 * | 4/2020 | Cavaliere | B25G 1/04 |
| 10,666,007 | B2 * | 5/2020 | Berkenbush | B25B 13/5016 |
| D893,963 | S | 8/2020 | Tyson | |
| 11,224,958 | B2 * | 1/2022 | Coffland | B25B 13/481 |
| 11,229,992 | B2 * | 1/2022 | Coffland | B25B 13/28 |
| 2005/0098001 | A1 * | 5/2005 | Walker | G09F 3/00<br>81/439 |
| 2005/0166723 | A1 * | 8/2005 | Sheek | B25B 13/48<br>81/413 |
| 2006/0207393 | A1 * | 9/2006 | Stupar | B25G 1/025<br>81/177.2 |
| 2016/0107296 | A1 | 4/2016 | Marcelle | |

* cited by examiner

BASIN WRENCH ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to wrench devices and more particularly pertains to a new wrench device for manipulating a nut on a faucet water line. The device includes a telescopic handle and a wrench that is pivotally coupled to the telescopic handle. The wrench is pivotable about a longitudinal axis of the telescopic handle. The wrench includes a first jaw and a second jaw that is pivotally coupled to the first jaw for engaging the nut. The device includes a tab that is attached to the telescopic handle and which is biased against the telescopic handle for locking the telescopic handle at a desired length. The tab is pulled away from the telescopic handle to facilitate the telescopic handle to be lengthened or shortened.

(2) Description of Related Art Including Information Disclosed Under 37 CFR 1.97 and 1.98

The prior art relates to wrench devices including a variety of basin wrenches that each includes a pair of jaws that are each pivotally disposed on a handle such that the jaws are pivotable about a longitudinal axis of the handle. In each instance the basin wrenches has a handle of a fixed length. The prior art discloses a basin wrench that includes a pair of ratchet jaws each movably coupled to a pair of stationary jaws and a handle with a telescopic length. The prior art discloses a basin wrench with includes handle, a T-bar that is pivotally coupled to the handle and a magnetic retainer for retaining the T-bar in a stowed position. The prior art discloses a basin wrench that includes a telescopic handle, a wrench pivotally coupled to the telescopic handle and a lock.

(h) BRIEF SUMMARY OF THE INVENTION

An embodiment of the disclosure meets the needs presented above by generally comprising a handle which comprises a first section that slidably engages a second section such that the handle has a telescopically adjustable length. A wrench is pivotally coupled to the handle such that the wrench is pivotable along an axis that is perpendicularly oriented with a longitudinal axis of the handle. In this way the wrench can be positioned to engage a nut on a water line attached to a faucet beneath a counter. The wrench comprises a pair of jaws that is pivotally coupled to each other thereby facilitating each of the jaws to engage the nut.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
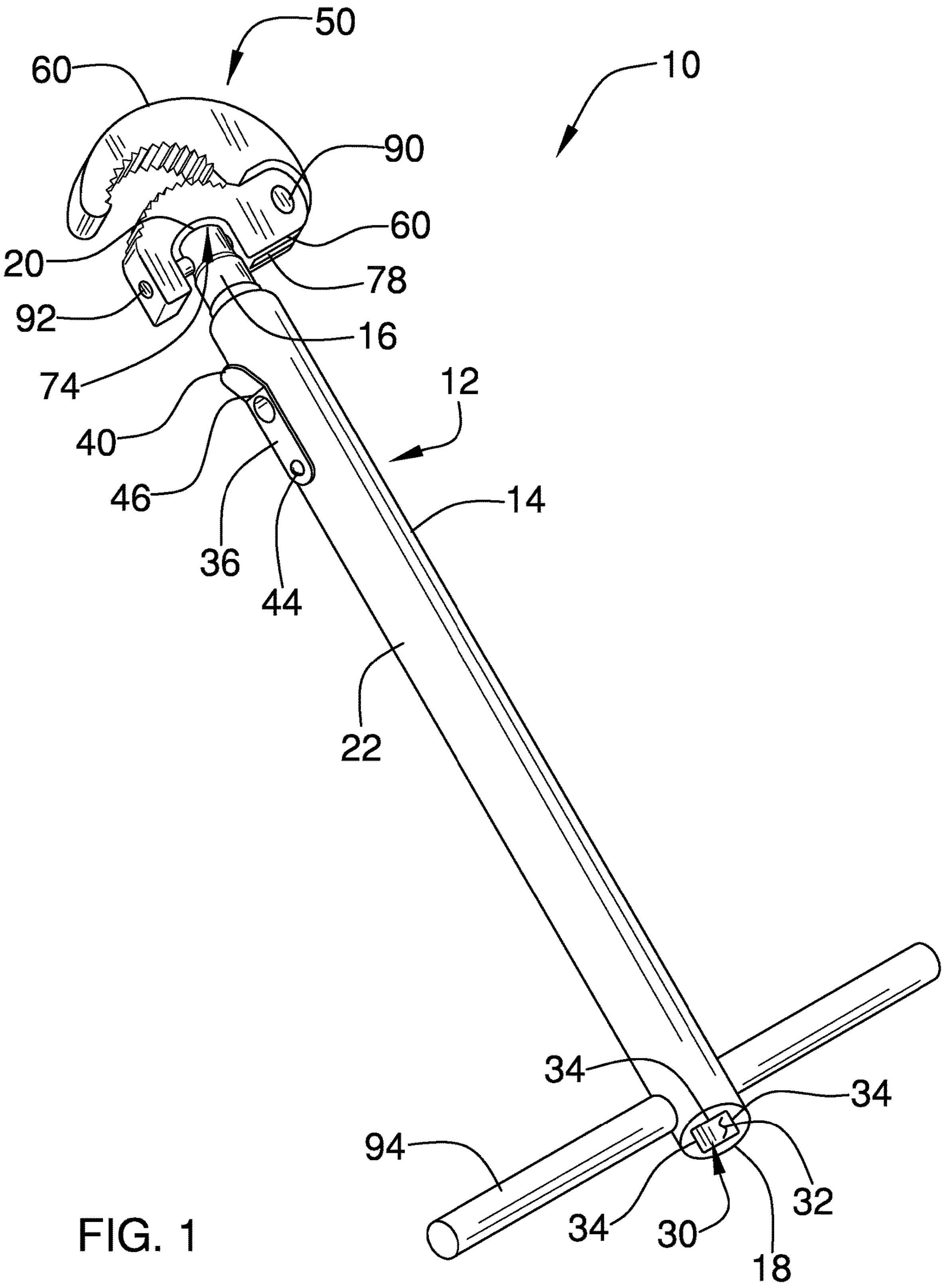
FIG. 1 is a perspective view of a basin wrench assembly according to an embodiment of the disclosure.
Figure 2:
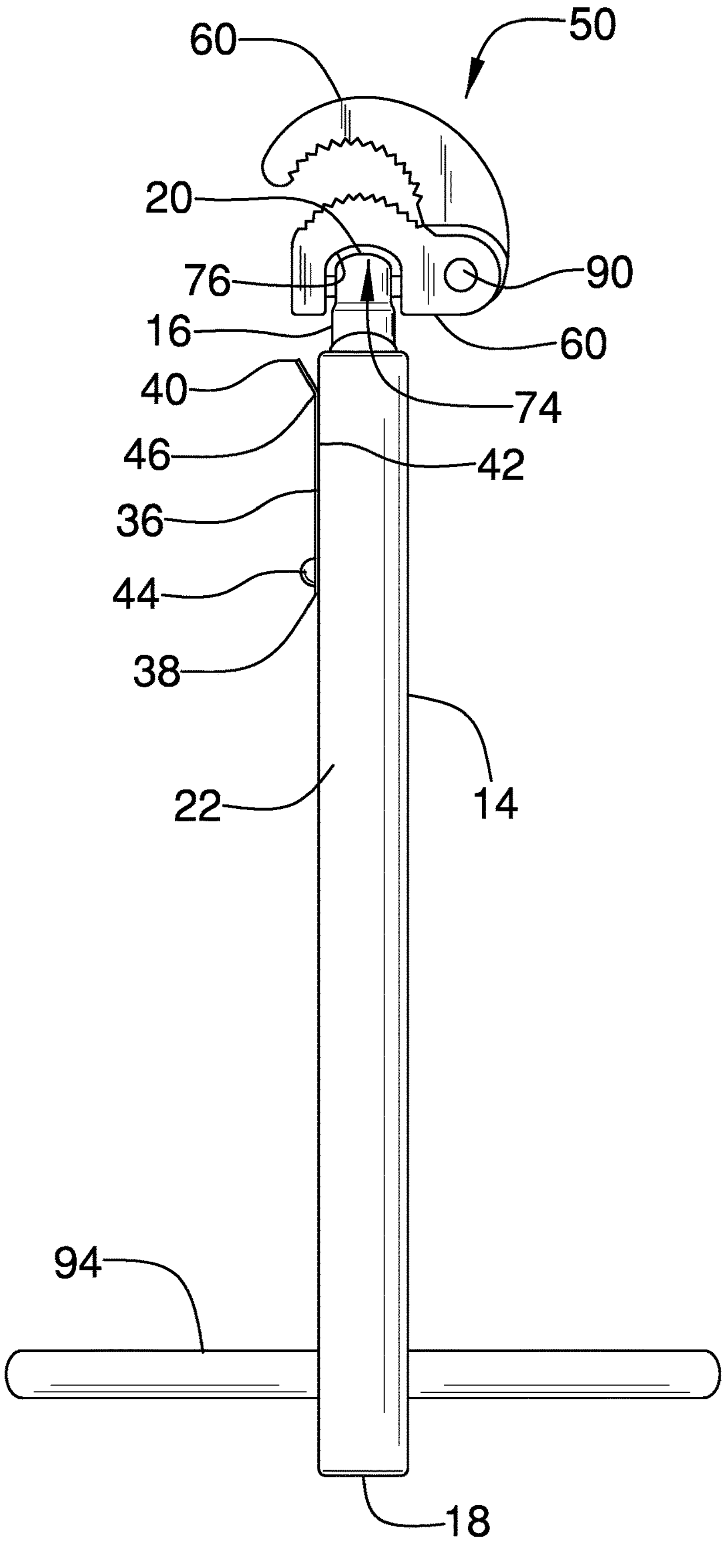
FIG. 2 is a front view of an embodiment of the disclosure.
Figure 3:
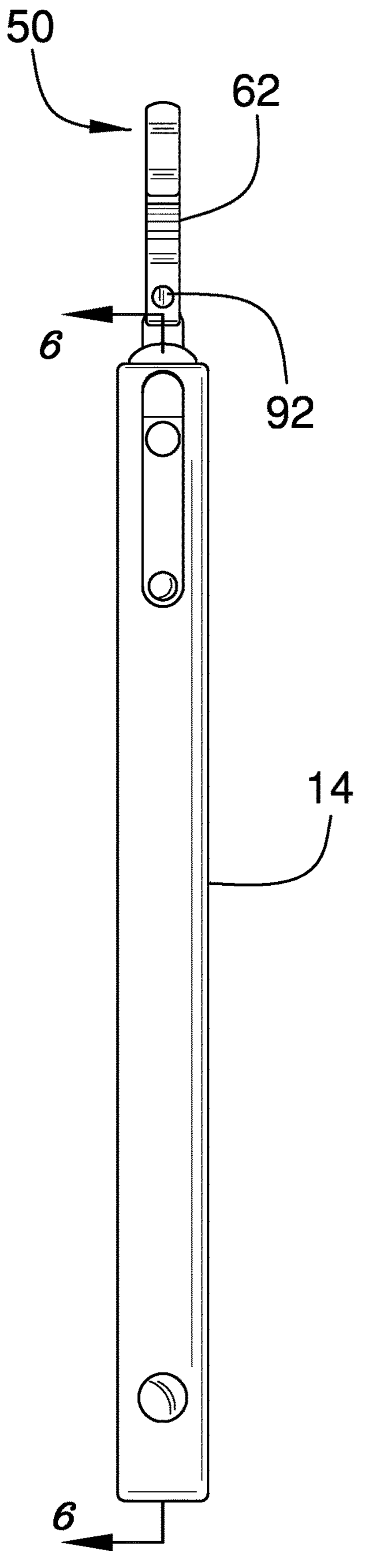
FIG. 3 is a front view of an embodiment of the disclosure.
Figure 4:
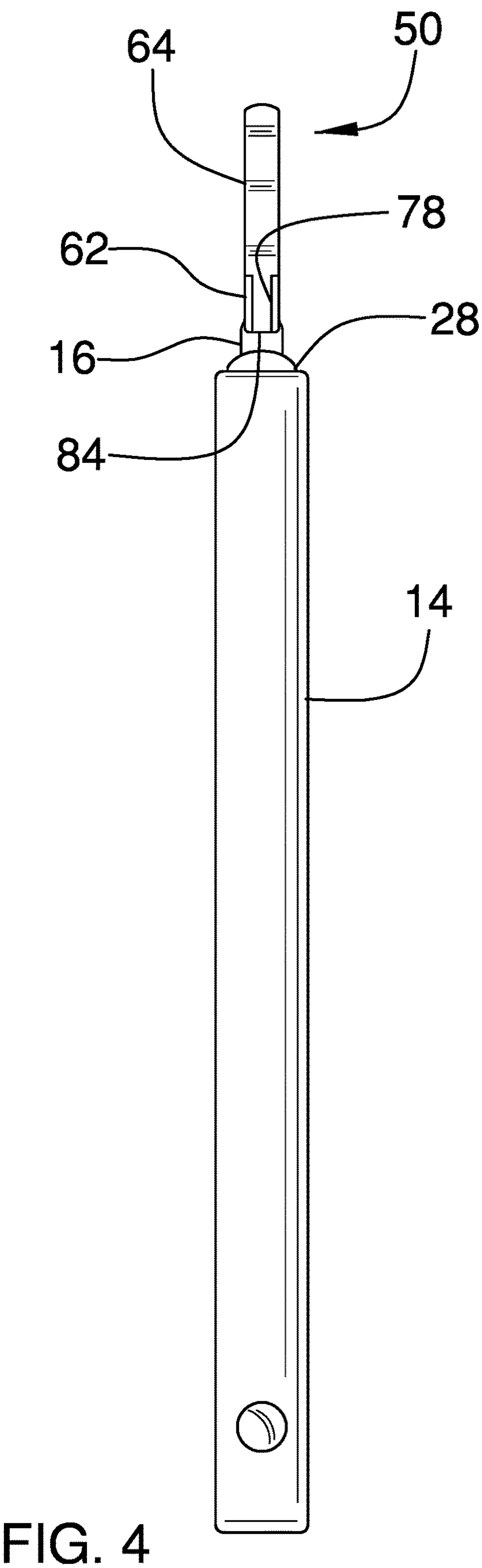
FIG. 4 is a back view of an embodiment of the disclosure.
Figure 5:
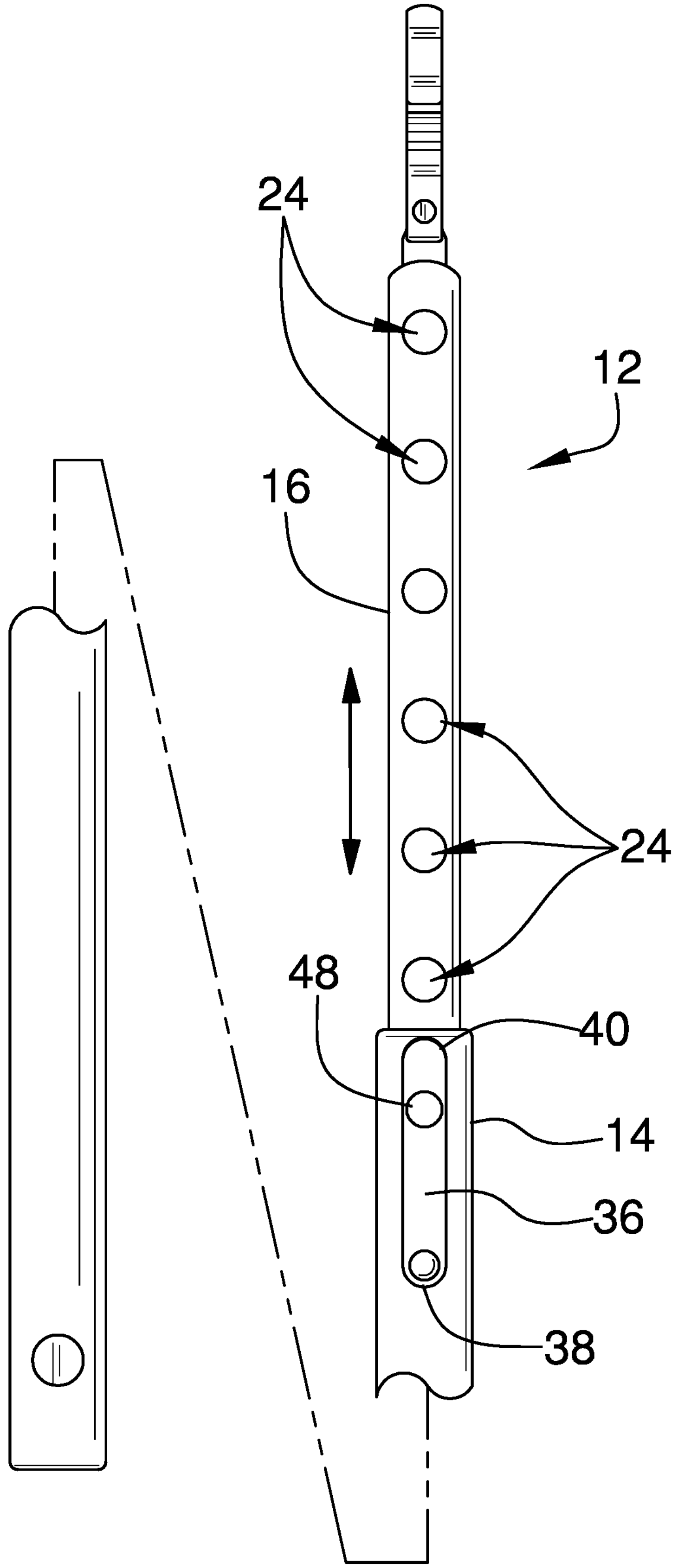
FIG. 5 is a front view of an embodiment of the disclosure showing a second section of a handle being extended out of a first section of the handle.
Figure 6:
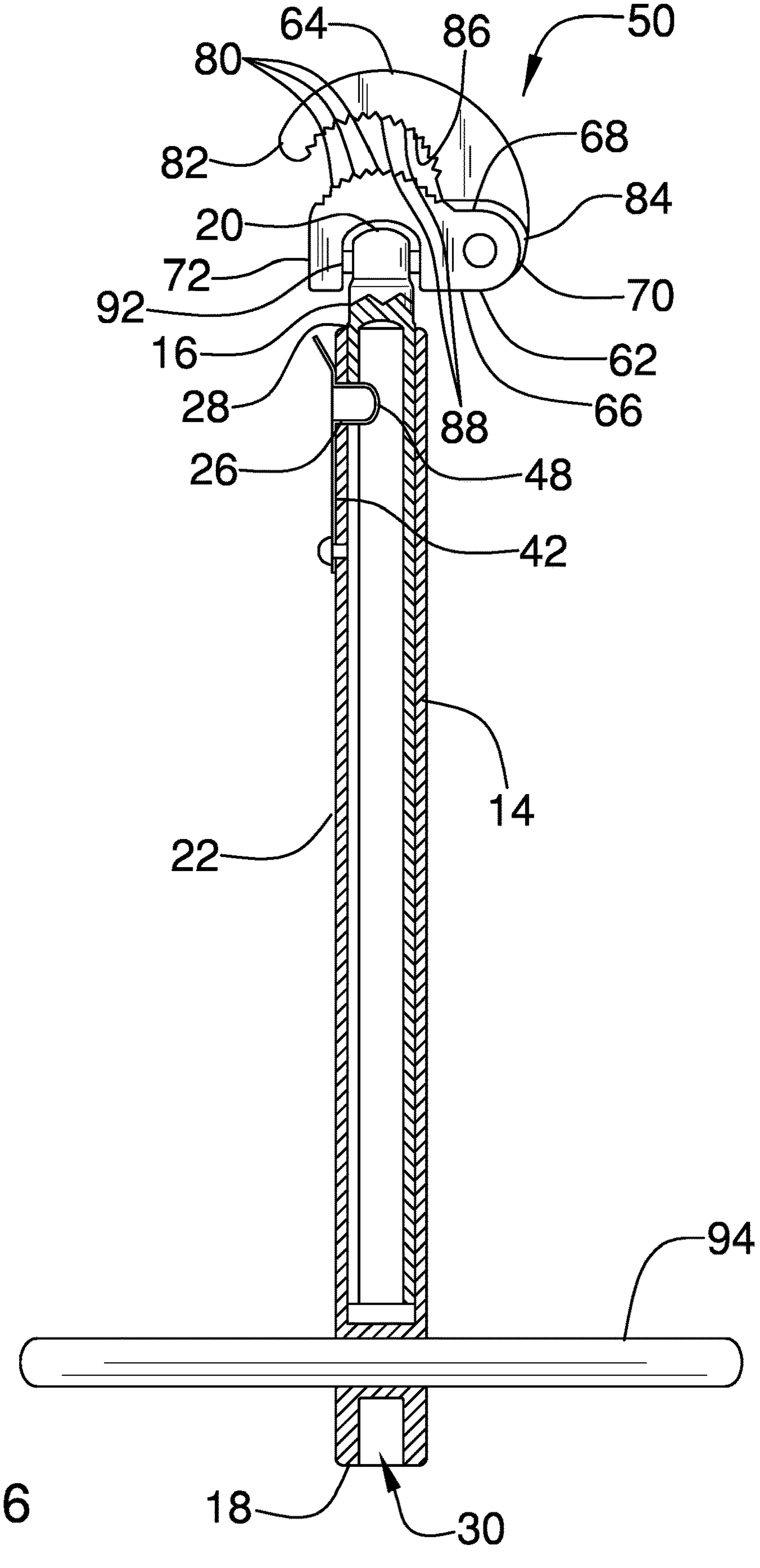
FIG. 6 is a cross sectional view taken along line 6-6 of FIG. 3 of an embodiment of the disclosure.
Figure 7:
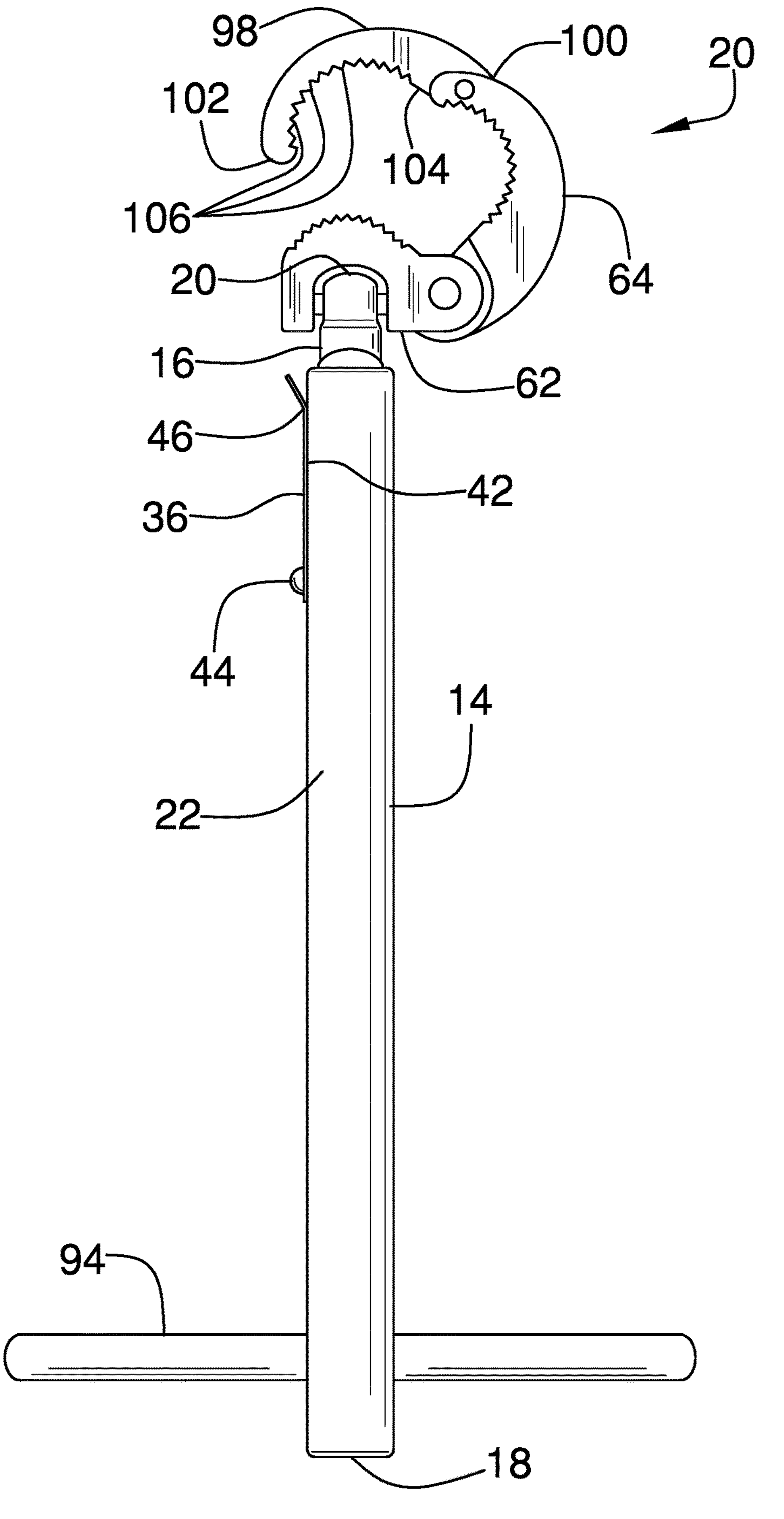
FIG. 7 is a perspective view of an alternative embodiment of the disclosure.
Figure 8:
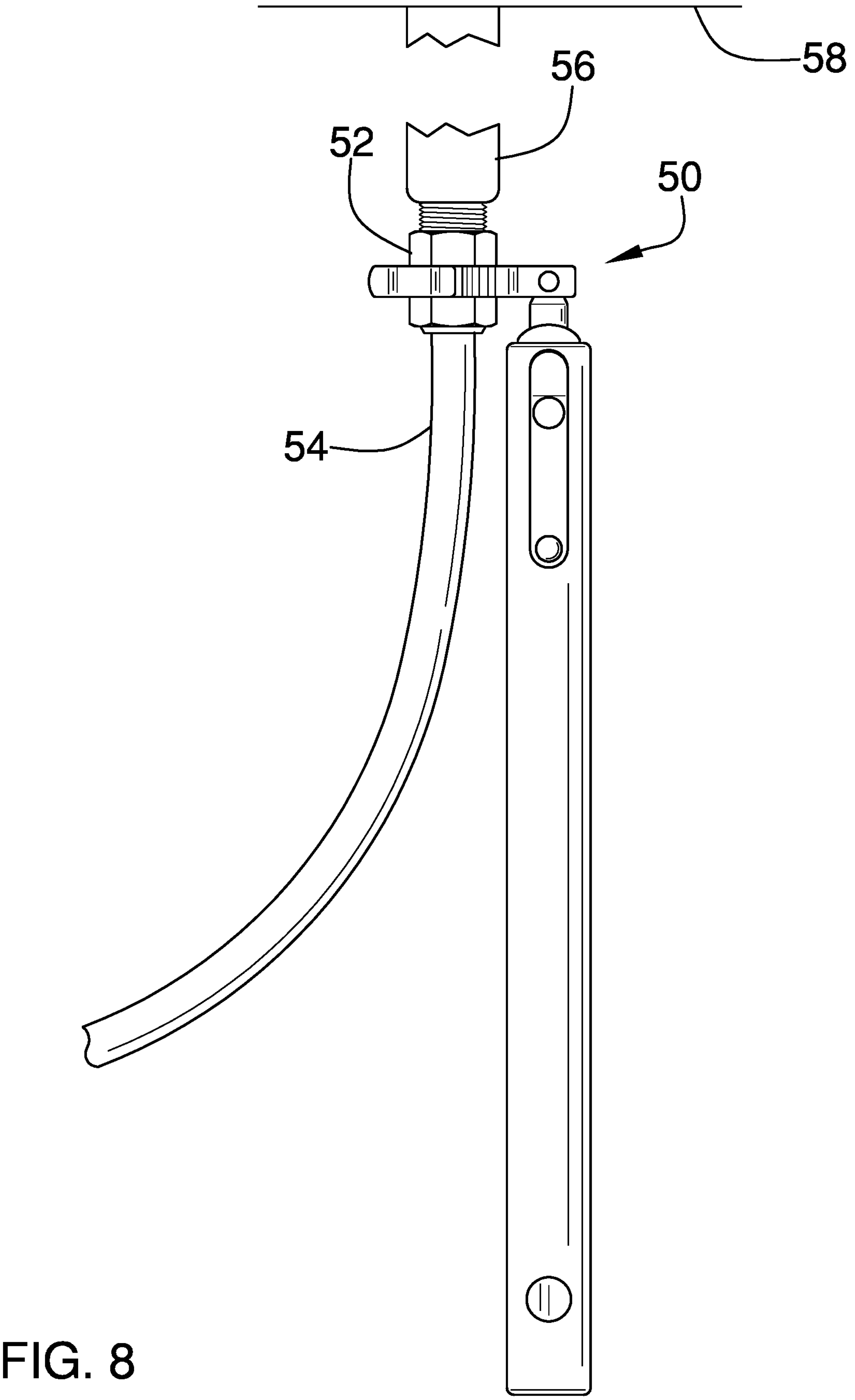
FIG. 8 is a perspective in-use view of an embodiment of the disclosure.

With reference now to the drawings, and in particular to FIGS. 1 through 8 thereof, a new wrench device embodying the principles and concepts of an embodiment of the disclosure and generally designated by the reference numeral 10 will be described.

As best illustrated in FIGS. 1 through 8, the basin wrench assembly 10 generally comprises a handle 12 which comprises a first section 14 which slidably receives a second section 16 such that the handle 12 has a telescopically adjustable length. The handle 12 has a first end 18, a second end 20 and an outer wall 22 extending between the first end 18 and the second end 20. The handle 12 is elongated between the first end 18 and the second end 20, and the second end 20 is rounded. The first end 18 is associated with the first section 14 and the second end 20 is associated with the second section 16. The outer wall 22 associated with the second section 16 has a plurality of holes 24 each extending through the outer wall 22 associated with the second section 16, and the holes 24 are spaced apart from each other and are distributed along a full length of the second section 16. Furthermore, the handle 12 may have a length of at least 12.0 inches.

The outer wall 22 of associated with the first section 14 has an opening 26 extending through the outer wall 22 associated with the first section 14, and the opening 26 is positioned adjacent to a terminal end 28 of the first section 14. The first end 18 has a well 30 extending toward the terminal end 28 of the first section 14. The well 30 has a bounding surface 32 and the bounding surface 32 has a plurality of intersecting sides 34 such that the well 30 has a rectangular shape. In this way the well 30 can insertably receive a driver of a socket wrench or other similar tool.

A tab 36 is provided that has a primary end 38, a secondary end 40 and a first surface 42 extending between the primary end 38 and the secondary end 40, and the first surface 42 lies against the outer wall 22 associated with the first section 14 of the handle 12. The tab 36 is coupled to the outer wall 22 associated with the first section 14 of the handle 12 at a connection point 44 located adjacent to the secondary end 40 of the tab 36. The connection point 44 may be a rivet or other type of fastener. The tab 36 has a bend 46 that is positioned adjacent to the primary end 38 of the tab 36 such that the primary end 38 of the tab 36 is directed away from the outer wall 22 associated with the first section 14 thereby facilitating the primary end 38 to be gripped. The tab 36 is biased to lie against the outer wall 22 associated with the first section 14 and the tab 36 has a lobe 48 extending away from the first surface 42. The lobe 48 is positioned adjacent to the bend 46 and the lobe 48 extends through the opening 26 in the outer wall 22 associated with the first section 14. The lobe 48 extends through a respective one of the holes 24 in the outer wall 22 associated with the second section 16 for retaining the handle 12 at a selected length. The lobe 48 is displaced from the holes 24 in the outer wall 22 associated with the second section 16 when the tab 36 is urged away from the outer wall 22 associated with the first section 14.

A wrench 50 is pivotally coupled to the handle 12 such that the wrench 50 is pivotable along an axis is perpendicularly oriented with a longitudinal axis of the handle 12. In this way the wrench 50 can be positioned to engage a nut 52 on a water line 54 attached to a faucet 56 beneath a counter 58. The faucet 56 may be a faucet in a kitchen, a bathroom or any other similar type of plumbing fixture, and the counter 58 may be a bathroom vanity, a kitchen counter. The wrench 50 comprises a pair of jaws 60 that are pivotally coupled to each other to engage the nut 52. The pair of jaws 60 includes a first jaw 62 and a second jaw 64, and the first jaw 62 has a bottom surface 66, a top surface 68, a first end 70 and a second end 72. Overall, the wrench 50 may have a width of no more than 2.5 inches thereby facilitating the wrench 50 to fit into tight spaces that conventional tools, such as a pair of pliers for example, would not be able to access.

The bottom surface 66 has a recess 74 extending toward the top surface 68 and the recess 74 has a bounding surface 76. The bounding surface 76 of the recess 74 is concavely arcuate with respect to the top surface 68, and the second end 20 of the handle 12 is positioned in the recess 74. The first end 70 of the first jaw 62 has a slot 78 extending toward the second end 20. The top surface 68 curves away from the bottom surface 66, and the top surface 68 has a plurality of first teeth 80 integrated into the top surface 68. The first teeth 80 are distributed between the second end 20 and the slot 78 in the first end 18.

The second jaw 64 has a primary end 82, a secondary end 84 and a lower surface 86, and the second jaw 64 is curved between the primary end 82 and the secondary end 84 of the second jaw 64. The secondary end 84 of the second jaw 64 is positioned in the slot 78 in the first end 70 of the first jaw 62 and the lower surface 86 has a plurality of second teeth 88 that are integrated in the lower surface 86. The second teeth 88 are distributed along a substantial length of the lower surface 86 and the second teeth 88 are directed toward the first teeth 80. A first pin 90 extends through the slot 78 in the first jaw 62 and engages the second jaw 64 for pivotally attaching the first jaw 62 to the second jaw 64. A second pin 92 extends through the recess 74 in the in the bottom surface 66 of the first jaw 62 and extends through the outer wall 22 of the handle 12 associated with the second section 16 of the handle 12 for pivotally attaching the handle 12 to the first jaw 62. Furthermore, the second jaw 64 might be biased toward the first jaw 62 via a biasing member integrated into the first pin 90.

A bar 94 is provided which extends laterally through the handle 12 such that the bar 94 can be gripped for rotating the handle 12. The bar 94 extends along an axis that is perpendicularly oriented with the handle 12 and the bar 94 is positioned adjacent to the first end 18 of the handle 12. In an alternative embodiment 96 as is most clearly shown in FIG. 7, the wrench 50 includes a third jaw 98 that has a coupled end 100, a free end 102 and a lowermost surface 104 extending between the coupled end 100 and the free end 102. The lowermost surface 104 is concavely arcuate between the coupled end 100 and the free end 102. Furthermore, the coupled end 100 is pivotally coupled to the primary end 38 of the second jaw 64. The lowermost surface 104 has a plurality of third teeth 106 each integrated into the lowermost surface 104 and the plurality of third teeth 106 is directed toward the first teeth 80 on the first jaw 62.

In use, the primary end 38 of the tab 36 is pulled away from the handle 12 thereby facilitating the handle 12 to be adjusted to a desired length and the tab 36 is released to retain the handle 12 at the desired length. The handle 12 is manipulated to position the wrench 50 around the nut 52 on the water line 54 and, if necessary, the wrench 50 can be pivoted on the handle 12 to facilitate the handle 12 to be oriented in a manner that is accessible. The bar 94 is gripped to rotate the handle 12 to either tighten or loosen the nut 52. Additionally, a wrench 50 can be inserted into the well 30 for rotating the handle 12 instead of gripping the bar 94.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A basin wrench assembly for manipulating an under-counter water connection for a faucet, said assembly comprising:

a handle comprising a first section slidably receiving a second section such that said handle has a telescopically adjustable length;

a wrench being pivotally coupled to said handle such that said wrench is pivotable along an axis being perpendicularly oriented with a longitudinal axis of said handle wherein said wrench is configured to be positioned to engage a nut on a water line attached to a faucet beneath a counter, said wrench comprising a pair of jaws being pivotally coupled to each other wherein each of said jaws is configured to engage the nut;

wherein said handle has a first end, a second end and an outer wall extending between said first end and said second end, said handle being elongated between said first end and said second end, said first end being associated with said first section, said second end being associated with said second section, said second end is rounded;

wherein said outer wall associated with said second section having a plurality of holes each extending through said outer wall associated with said second section, said holes being spaced apart from each other and being distributed along a full length of said second section;

wherein said outer wall of associated with said first section has an opening extending through said outer wall associated with said first section, said opening being positioned adjacent to a terminal end of said first section;

wherein said first end having a well extending toward said terminal end of said first section, said well having a bounding surface, said bounding surface having a plurality of intersecting sides such that said well has a rectangular shape wherein said well is configured to insertably receive a driver of a socket wrench; and a tab having a primary end, a secondary end and a first surface extending between said primary end and said secondary end, first surface lying against said outer wall associated with said first section of said handle, said tab being coupled to said outer wall associated with said first section of said handle at a connection point located adjacent to said secondary end of said tab, said tab having a bend being positioned adjacent to said primary end of said tab such that said primary end of said tab is directed away from said outer wall associated with said first section thereby facilitating said primary end to be gripped, said tab being biased to lie against said outer wall associated with said first section.

2. The assembly according to claim 1, wherein said tab has a lobe extending away from said first surface, said lobe being positioned adjacent to said bend, said lobe extending through said opening in said outer wall associated with said first section.

3. The assembly according to claim 2, wherein said lobe extends through a respective one of said holes in said outer wall associated with said second section for retaining said handle at a selected length.

4. The assembly according to claim 2, wherein said lobe is displaced from said holes in said outer wall associated with said second section when said tab is urged away from said outer wall associated with said first section.

5. The assembly according to claim 1, wherein:

said pair of jaws includes a first jaw and a second jaw;

said first jaw having a bottom surface, a top surface, a first end and a second end;

said bottom surface has a recess extending toward said top surface, said recess having a bounding surface, said bounding surface being concavely arcuate with respect to said top surface, said second end of said handle being positioned in said recess; and said first end of said first jaw has a slot extending toward said second end of said first jaw, said top surface curving away from said bottom surface, said top surface having a plurality of first teeth being integrated into said top surface, said first teeth being distributed between said second end of said first jaw and said slot in said first end of said first jaw.

6. The assembly according to claim 5, wherein said second jaw has a primary end, a secondary end and a lower surface, said second jaw being curved between said primary end and said secondary end of said second jaw, said secondary end of said second jaw being positioned in said slot in said first end of said first jaw, said lower surface having a plurality of second teeth being integrated in said lower surface, said second teeth being distributed along a substantial length of said lower surface, said second teeth being directed toward said first teeth.

7. The assembly according to claim 5, further comprising a first pin extending through said slot in said first jaw and engaging said second jaw for pivotally attaching said first jaw to said second jaw.

8. The assembly according to claim 5, further comprising:

a first pin; and a second pin extending through said recess in said in said bottom surface of said first jaw and extending through said outer wall of said handle associated with said second section of said handle for pivotally attaching said handle to said first jaw.

9. The assembly according to claim 1, further comprising a bar extending laterally through said handle wherein said bar is configured to be gripped for rotating said handle, said bar extending along an axis perpendicularly oriented with said handle, said bar being positioned adjacent to said first end of said handle.

10. A basin wrench assembly for manipulating an under-counter water connection for a faucet, said assembly comprising:

a handle comprising a first section slidably receiving a second section such that said handle has a telescopically adjustable length, said handle having a first end, a second end and an outer wall extending between said first end and said second end, said handle being elongated between said first end and said second end, said first end being associated with said first section, said second end being associated with said second section, said outer wall associated with said second section having a plurality of holes each extending through said outer wall associated with said second section, said holes being spaced apart from each other and being distributed along a full length of said second section, said outer wall of associated with said first section having an opening extending through said outer wall associated with said first section, said opening being positioned adjacent to a terminal end of said first section, said first end having a well extending toward said terminal end of said first section, said well having a bounding surface, said bounding surface having a plurality of intersecting sides such that said well has a rectangular shape wherein said well is configured to insertably receive a driver of a socket wrench, said second end being rounded;

a tab having a primary end, a secondary end and a first surface extending between said primary end and said secondary end, first surface lying against said outer wall associated with said first section of said handle, said tab being coupled to said outer wall associated with said first section of said handle at a connection point located adjacent to said secondary end of said tab, said tab having a bend being positioned adjacent to said primary end of said tab such that said primary end of said tab is directed away from said outer wall associated with said first section thereby facilitating said primary end to be gripped, said tab being biased to lie against said outer wall associated with said first section, said tab having a lobe extending away from said first surface, said lobe being positioned adjacent to said bend, said lobe extending through said opening in said outer wall associated with said first section, said lobe extending through a respective one of said holes in said outer wall associated with said second section for retaining said handle at a selected length, said lobe being displaced from said holes in said outer wall associated with said second section when said tab is urged away from said outer wall associated with said first section;

a wrench being pivotally coupled to said handle such that said wrench is pivotable along an axis being perpendicularly oriented with a longitudinal axis of said handle wherein said wrench is configured to be positioned to engage a nut on a water line attached to a faucet beneath a counter, said wrench comprising a pair of jaws being pivotally coupled to each other wherein each of said jaws is configured to engage the nut, said pair of jaws including a first jaw and a second jaw, said first jaw having a bottom surface, a top surface, a first end and a second end, said bottom surface having a recess extending toward said top surface, said recess having a bounding surface, said bounding surface being concavely arcuate with respect to said top surface, said second end of said handle being positioned in said recess, said first end of said first jaw having a slot extending toward said second end of said first jaw, said top surface curving away from said bottom surface, said top surface having a plurality of first teeth being integrated into said top surface, said first teeth being distributed between said second end of said first jaw and said slot in said first end of said first jaw, said second jaw having a primary end, a secondary end and a lower surface, said second jaw being curved between said primary end and said secondary end of said second jaw, said secondary end of said second jaw being positioned in said slot in said first end of said first jaw, said lower surface having a plurality of second teeth being integrated in said lower surface, said second teeth being distributed along a substantial length of said lower surface, said second teeth being directed toward said first teeth;

a first pin extending through said slot in said first jaw and engaging said second jaw for pivotally attaching said first jaw to said second jaw;

a second pin extending through said recess in said in said bottom surface of said first jaw and extending through said outer wall of said handle associated with said second section of said handle for pivotally attaching said handle to said first jaw; and a bar extending laterally through said handle wherein said bar is configured to be gripped for rotating said handle, said bar extending along an axis perpendicularly oriented with said handle, said bar being positioned adjacent to said first end of said handle.

11. The assembly according to claim 10, wherein said wrench includes a third jaw having a coupled end, a free end and a lowermost surface extending between said coupled end and said free end, said lowermost surface being concavely arcuate between said coupled end and said free end, said coupled end being pivotally coupled to said primary end of said second jaw, said lowermost surface having a plurality of third teeth each being integrated into said lowermost surface, said plurality of third teeth being directed toward said first teeth on said first jaw.

* * * * *